No. 704,328. Patented July 8, 1902.
S. A. HEMRY.
OVEN.
(Application filed Sept. 3, 1901.)

(No Model.)

Witnesses.
Wm Gordon
Carl F. Horn

Inventor.
Sarah A. Hemry
per Eugene Ayres,
Attorney

THE NORRIS PETERS CO., PHOTO-LITHO., WASHINGTON, D. C.

UNITED STATES PATENT OFFICE.

SARAH A. HEMRY, OF ST. JOSEPH, MISSOURI.

OVEN.

SPECIFICATION forming part of Letters Patent No. 704,328, dated July 8, 1902.

Application filed September 3, 1901. Serial No. 74,215. (No model.)

*To all whom it may concern:*

Be it known that I, SARAH A. HEMRY, a citizen of the United States, residing at St. Joseph, in the county of Buchanan and State of Missouri, have invented certain new and useful Improvements in Ovens; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to ovens used on gasolene and gas stoves; and the objects sought to be attained by my improvements are, first, to economize fuel by concentrating nearly all the heat in a smaller space in the oven; second, to utilize all heat by means of a plate set just above the article to be baked; third, through this concentration and utilization of heat to provide an oven that will bake more quickly, that will neither flake nor dry the bread, and that will bake the tops of articles as quickly and as brown as they are baked at the bottom.

I attain my objects by the mechanism illustrated in the accompanying drawings, in which—

Figure 1:
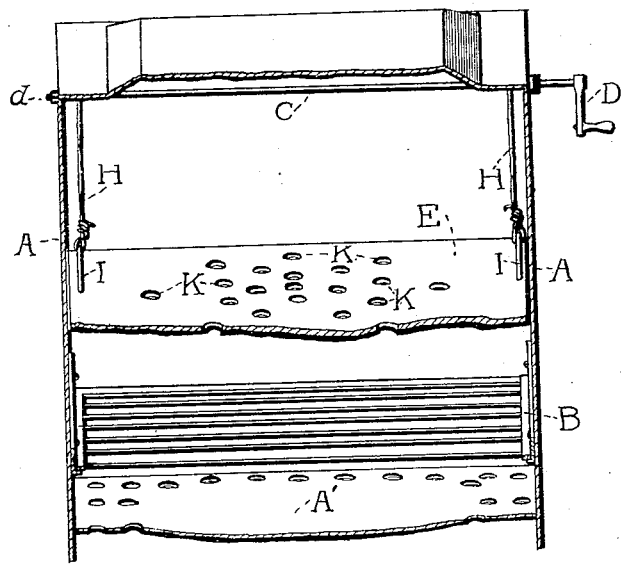
Figure 2:
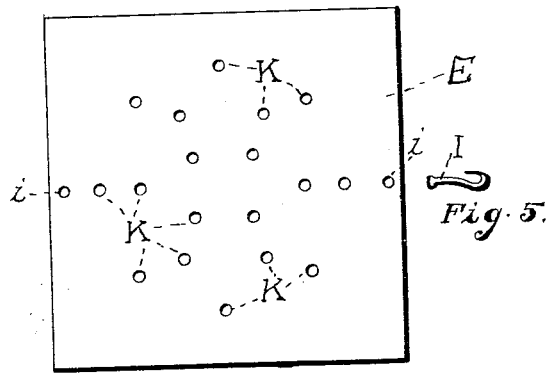
Figure 3:
Figure 4:
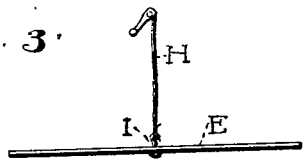

Figure 1 is a view of an oven with the entire front broken away, showing the plate therein and the means for elevating and lowering it. Fig. 2 is a top view of the plate and its vents. Fig. 3 is a view of the shaft and crank with pliable wires attached. Fig. 4 is a side view of the crank, the plate and one of its hooks, and one of the connecting-wires; and Fig. 5 is one of said hooks.

Similar letters refer to similar parts throughout the several views.

In the drawings, A A represent the sides of the oven, and A' the bottom thereof, with the usual gasolene-stove-oven openings therein.

B is a sliding grate.

C is an iron-shaft, the ends of which protrude through suitable apertures in the sides A A near their tops, one end of the shaft being provided with a crank D and the other end with a nut $d$.

E is a light plate, preferably of cast-iron, made a size that will fit snugly into the oven, yet allow it to be raised and lowered freely.

H H are small flexible wires, preferably consisting of three or four strands, connected at the upper ends with shaft C, preferably by being inserted through perforations provided therefor in said shaft and held in position by simply having the ends brought around the shaft and twisted or tied and which have their lower ends connected with plate E by means of hooks I I, which hooks are attached to plate E near its sides through apertures $i\ i$.

The oven being set on the top of a gasolene or gas stove, plate E is adjusted near the bottom of the oven in proximity to the flames of the burners until thoroughly hot and then elevated, by means of the crank, shaft, and pliable wires, to permit the article to be baked to be inserted below it, or the plate may be adjusted to the desired height as soon as the process of heating the oven begins. Preferably in baking the wires are wound on or off the shaft until the plate is about one or two inches above the top of the bread, biscuit, meat, potatoes, or whatever food is to be baked.

If it is borne in mind that in ordinary use, except in baking yeast or light bread, the upper half or two-thirds of the oven-space is seldom used, it will at once be apparent that the large amount of heat prevented by plate E from ascending into the unoccupied part of the oven necessarily economizes the fuel and heat, and there being so little waste heat the process of baking is accelerated. Moreover, by having the tops of articles to be baked in proximity to a hot plate of cast-iron the dry hot air usual above a baking in an oven is largely avoided, and the nutritious and much-desired flavor peculiar to articles baked in cast-iron-stove ovens is obtained.

In this improved oven the usual draft-vents in the sides are wholly dispensed with, and perforations K K through plate E are substituted, as shown in Fig. 2.

My herein-described device can be adapted to electricity and can also be adapted to ovens as now constructed within gas-stoves by merely dispensing with the vents in the upper parts of the ovens and substituting vents below the lowest horizontal line to which plate E would ever be lowered and to a line below that of the flame. As in these old-style gas-ovens the hot air goes direct from the flames into the oven, the baking being thus frequently impregnated with the disagreeable gas-odor, it will be readily seen that by the adoption of my device to these ovens and changing the position of the vents, as indicated, this offensive odor can be avoided. At the same time the other advantageous features of my device are obtained.

What I claim, and desire to secure by Letters Patent, is—

1. The combination with an oven without side vents to be set on the top of a gasolene or gas stove over the flame or flames thereof, and its grates, of a single light-metal perforated plate of single thickness adapted to be hung in the oven above the grates, of the horizontal shaft located permanently near top of the oven and its crank and nut on outside of the oven, of the flexible wires having connection with said shaft at points in the oven near the sides and with hooks rigidly set in the plate near its sides at a line equidistant between the front and back of the oven, substantially as described.

2. The combination with a gas or gasolene stove oven provided with vents or openings in its bottom only, and with a lower grate, of the shaft C, its crank D and nut $d$, the light vertically-adjustable plate E provided with draft-perforations K K and hooks I I, and duplicate flexible wires H H having connection with said shaft near each end and with said plate-hooks, substantially as described and for the purpose specified.

In testimony whereof I affix my signature in presence of two witnesses.

SARAH A. HEMRY.

Witnesses:
WILL FINDLAY,
ANDY B. KERR.